O. A. LARSON AND C. J. LALLISS.
RADIATOR COVER.
APPLICATION FILED DEC. 15, 1920.
1,401,339.
Patented Dec. 27, 1921.
2 SHEETS—SHEET 2.
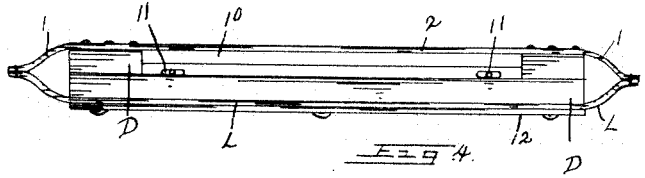
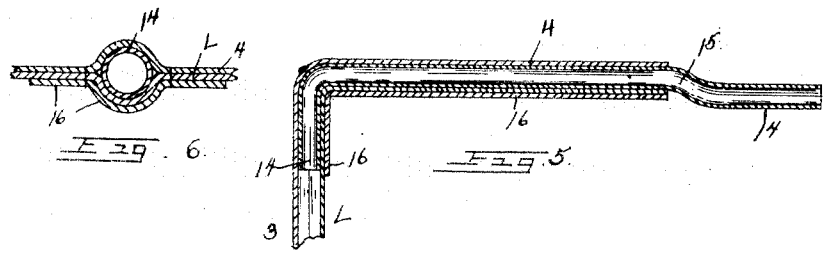
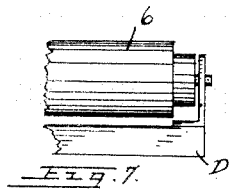
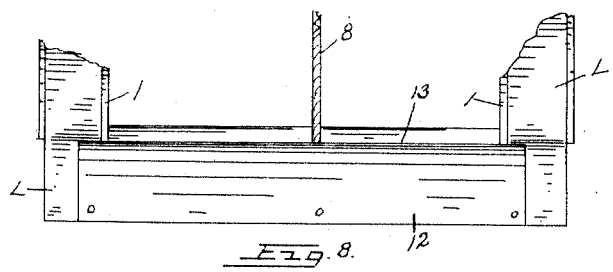
Ole Alonzo Larson and
Charles J Lalliss
INVENTORS
BY J. M. Thomas
ATTORNEY

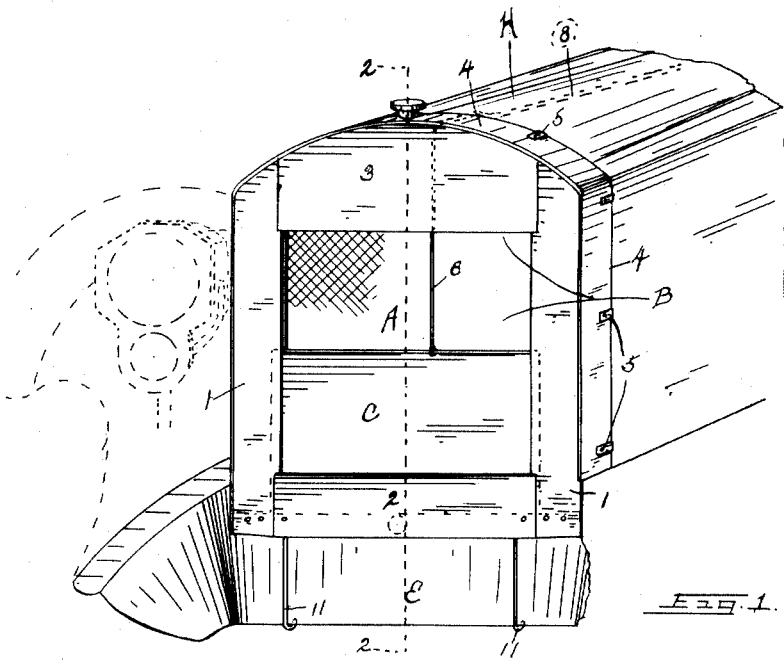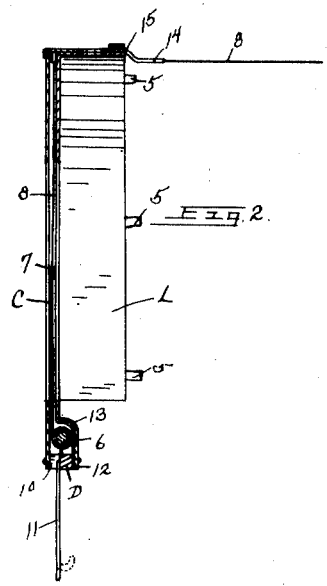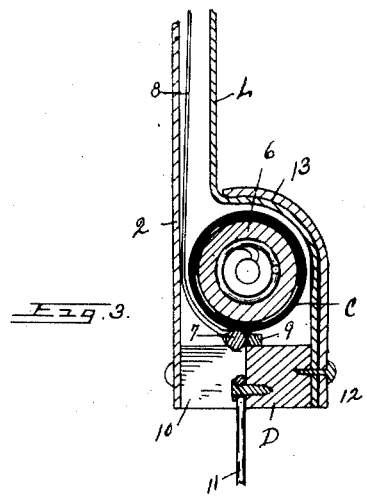

UNITED STATES PATENT OFFICE.

OLE ALONZO LARSON AND CHARLES J. LALLISS, OF SALT LAKE CITY, UTAH.

RADIATOR-COVER.

1,401,339.  Specification of Letters Patent.  Patented Dec. 27, 1921.

Application filed December 15, 1920. Serial No. 430,954.

*To all whom it may concern:*

Be it known that we, OLE ALONZO LARSON and CHARLES J. LALLISS, citizens of the United States, residing at Salt Lake City, in the county of Salt Lake and State of Utah, have invented certain new and useful Improvements in Radiator-Covers, of which the following is a specification.

Our invention relates to covers for vehicle radiators, and has for its object to provide a detachable and flexible cover for a radiator of an automobile which will protect it from cold but may be readily adjusted in order to not interfere with the operation of the vehicle.

These objects we accomplish with the device illustrated in the accompanying drawings, in which similar letters and numerals of reference indicate like parts throughout the several figures, and as described in the specification forming a part of this application and pointed out in the appended claims.

In the drawings, in which we have shown a substantial embodiment of our invention, Figure 1 is a view in perspective of the front portions of an automobile with our device in place thereon, with the shutter partially drawn. Fig. 2 is a section on line 2—2 Fig. 1. Fig. 3 is a transverse section similar to that shown of the lower portions of Fig. 2 of the device, somewhat enlarged from the other views. Fig. 4 is an inverted plan view of the lower portion of the device. Fig. 5 is a longitudinal and Fig. 6 is a transverse, section of the cord carrying tube and adjacent parts of the device. Fig. 7 is an elevation of the end portions of the shutter roller, bearing and base mounting for the roller. Fig. 8 is an elevation of the lower portions of the device looking at it from the inside or rear.

In the drawings we have shown the radiator A mostly covered with our device, which is made of flexible fabric such as pantasote, or other similar material substantially waterproof, with a lining of other fabric which is cold-resistant and flexible. The outer fabric when formed into our cover has two vertical edge strips 1 to which strips are sewed, the bottom strip 2 and upper strip 3, with a band strip 4 which is attached to and at right angles to portions of said strips 1 and 3, thus forming practically a rectangularly shaped hood made to fit snugly the front, sides and top of the radiator frame. On the rear edges of said strip 4 are secured metal strips 5 which are to be bent to engage the rear edges of the radiator to hold the cover from slipping forward and off of the radiator frame. A lining fabric L, made of felt, cotton flannel or other similar material which is cold-resistant, is similarly shaped and constructed and in construction is fastened to the inner corners of the outer covering. When thus constructed the fabric portions of our device have a central opening B which is to be normally closed by a shutter member C during cold weather and which is made of the same fabric as is used in the outer cover, that is, flexible, substantially waterproof and which is tough, and is fastened at its lower end to the roller 6 and may be wound around said roller 6. The said shutter member C is somewhat wider that the opening B in order that its side edges may extend between the strips 1 of the outer fabric and similar strips of the lining fabric L, the two fabrics acting as guide strips for said shutter member. A stay member 7 is secured in the end edge of said shutter, preferably given a rod form and to which is fastened the cord 8. The tension of the spring of the roller 6 will normally wind the said shutter C upon the roller and expose the face of the radiator A. The said stay member will engage a stop piece 9 which is fastened to the base block D, when all of the shutter is wound on said roller, and this stop piece limits the movement of the shutter in one direction while its length limits the movement in the other. The base or spacing block D is fastened between the two fabrics to space them apart and form a roller support and channel. It is preferably made of wood, and has a portion cut out of one side edge, to form a recess, as at 10, through which any dust, mud or water will fall or may be easily removed therethrough. The depending fastening members 11 are secured to said base D within the recess 10, and preferably they consist of stiff wires pivoted near each end of said recess, and when the cover is removed from the radiator they may be moved on their respective pivots to fold within the recess, and when in use are to be bent into hook form to engage the mud guard E and thereby hold the device from upward movement. A guard sheet of metal 12, preferably of tin plate, is fastened on the rear edge of said base D, and with the edge of the lining fabric L inserted and held between the sheet and base block. The upper edge of said metal sheet is curved in semi-cylindrical shape, as at 13, to form a shield for the said roller, and shutter when rolled down, and to direct any foreign matter outwardly through the recess 10. A cord conduit or passage tube is fastened between the two fabrics near the inlet of the radiator and consists of a tube of soft material, such as copper pipe 14 which is given a short or right angle bend at the inner corner of the cover to conform with and fit the cover over the edge of the radiator. The said tube 14 has length sufficient to extend beyond the rear edge of the fabrics and at said rear edge of the fabric the tube is given a short crimp or double bend as at 15, to direct the extended portion below the hood H of the engine. The extended portion protects the cord from being cut by the hood H, while the whole tube allows the said cord 8 to be moved longitudinally without undue friction. If desired, an extra piece 16 of the outer fabric may be fastened in place, when the tube is being sewed into the cover, to prevent any wear or marring of the radiator by that portion of our cover.

When the cover is in place on the radiator of an automobile and viewed from in front, the strips 1, 3 and 4 will cover the frame of the radiator, and with the strip 2 which is held in front of the spring roller 6, will form a frame-like shield with a sight opening practically the size and shape of the radiator. The shutter C mounted on the roller 6 may be drawn upwardly as unwound from said roller by the cord 8 to close more or less of said sight opening, as desired, and the edges of said fabrics forming the sight opening also act as guides for the edges of the shutter.

Having thus described our invention we desire to secure by Letters Patent and claim:

1. In an automobile radiator cover the combination of strips of flexible waterproof fabric sewed together to form a frame-like shield having a rectangular sight opening; a lining therefor having similar form; a base block fastened between the lower end portions of said shield fabric and lining fabric and having a recess cut out of its front edge; a spring roller mounted on said base block; a flexible shutter adapted to be wound on said roller and to be unwound from said roller and cover more or less of the sight opening in said fabrics; a tube of easily bent material fastened between said fabrics and adjacent the filler pipe of the radiator; a cord having one end fastened to said shutter and passed through said tube toward the rear and under the hood of the automobile; and means to fasten the fabric shield to the radiator and mud guard of the automobile.

2. In an automobile radiator cover the combination of strips of flexible waterproof fabric sewed together to form a frame-like shield having a rectangular sight opening; a lining therefor having similar form; a base block fastened between the lower end portions of said shield fabric and lining fabric and having a recess cut out of its front edge; a spring roller mounted on said base block; a flexible shutter adapted to be wound on said roller and to be unwound from said roller and cover more or less of the sight opening in said fabrics; a tube of easily bent material fastened between said fabrics and over the radiator and adjacent the filler pipe thereof; a cord having one end fastened to said shutter and passed through said tube toward the rear and under the hood of the automobile; with means to fasten the fabric shield to the radiator and mud guard of the automobile; and a sheet of thin metal fastened to the rear edge of said base block and having its free edge portion curved concentrically with said roller.

In testimony whereof we affix our signatures.

OLE ALONZO LARSON.
CHARLES J. LALLISS.